United States Patent
Ingraci Neto et al.

(10) Patent No.: US 12,465,971 B1
(45) Date of Patent: Nov. 11, 2025

(54) EQUIPMENT FOR SIMULTANEOUS OR NEAR-SIMULTANEOUS FLASH SINTERING AND FORGING

(71) Applicant: Triad National Security, LLC, Los Alamos, NM (US)

(72) Inventors: Rubens Ingraci Neto, Los Alamos, NM (US); Erofili Kardoulaki, Los Alamos, NM (US); Darrin David Byler, Los Alamos, NM (US); Kenneth James Mcclellan, Los Alamos, NM (US)

(73) Assignee: Triad National Security, LLC, Los Alamos, TX (US)

(*) Notice: Subject to any disclaimer, the term of this patent is extended or adjusted under 35 U.S.C. 154(b) by 320 days.

(21) Appl. No.: 18/168,854

(22) Filed: Feb. 14, 2023

Related U.S. Application Data

(60) Provisional application No. 63/309,831, filed on Feb. 14, 2022.

(51) Int. Cl.
*B21J 5/02* (2006.01)
*B21J 9/20* (2006.01)
(Continued)

(52) U.S. Cl.
CPC . *B21J 5/02* (2013.01); *B21J 9/20* (2013.01); *B21J 13/02* (2013.01); *C04B 35/575* (2013.01); *C04B 35/593* (2013.01); *C04B 35/645* (2013.01)

(58) Field of Classification Search
CPC .............................. C04B 35/593; C04B 35/575
(Continued)

(56) References Cited

U.S. PATENT DOCUMENTS 3,508,029 A * 4/1970 Inoue .................... H05B 7/148
219/149
3,665,151 A * 5/1972 Piper ......................... B22F 3/14
219/149

(Continued)

FOREIGN PATENT DOCUMENTS

CN 111981847 * 11/2020
WO WO 2015/185969 A1 12/2015

OTHER PUBLICATIONS

Manière et al., "All-Materials-Inclusive Flash Spark Plasma Sintering," Scientific Reports, 7:15071, (Nov. 8, 2017).

*Primary Examiner* — Jeffrey M Wollschlager
(74) *Attorney, Agent, or Firm* — ALSTON & BIRD LLP

(57) ABSTRACT

Embodiments of the present disclosure provide equipment, systems, devices, apparatuses, methods, and/or the like for flash sinter-forging, or simultaneous or near-simultaneous flash sintering and forging to produce dense and net or near-net shaped objects. Embodiments may be applied to the production of ceramic objects through efficient densification and shaping of ceramic powder. Flash sinter-forging includes the application of high electric fields, electric current, heat, and mechanical pressure to a material within an operation time period, spanning a few minutes, in some examples. The electrification of the material with flash sintering enables lower temperatures to be used to appropriately forge and shape the material into the target object, thereby providing a synergistic and resource-conserving technical effect. In some examples, more than 90% of energy expenditures for object production can be saved using flash sinter-forging in accordance with various embodiments described herein.

20 Claims, 11 Drawing Sheets

(51) Int. Cl.
*B21J 13/02* (2006.01)
*C04B 35/575* (2006.01)
*C04B 35/593* (2006.01)
*C04B 35/645* (2006.01)

(58) Field of Classification Search
USPC .............................................. 219/149, 91.23
See application file for complete search history.

(56) References Cited

U.S. PATENT DOCUMENTS

| | | | | |
|---|---|---|---|---|
| 3,873,805 | A * | 3/1975 | Inoue | F28F 13/185 |
| | | | | 219/149 |
| 6,383,446 | B1 * | 5/2002 | Tokita | B28B 13/022 |
| | | | | 419/38 |
| 6,612,826 | B1 * | 9/2003 | Bauer | B30B 11/005 |
| | | | | 425/355 |
| 8,940,220 | B2 | 1/2015 | Raj et al. | |
| 9,227,244 | B2 * | 1/2016 | Fais | H01F 41/0266 |
| 9,334,194 | B2 | 5/2016 | Raj et al. | |
| 10,207,956 | B2 | 2/2019 | Chu et al. | |
| 10,774,890 | B2 * | 9/2020 | Bianco | F16D 65/00 |
| 2005/0220921 | A1 * | 10/2005 | Olsson | B21J 7/02 |
| | | | | 425/352 |
| 2013/0177740 | A1 * | 7/2013 | Merrill | B22F 5/009 |
| | | | | 427/535 |
| 2014/0014639 | A1 | 1/2014 | Couret et al. | |
| 2014/0306381 | A1 | 10/2014 | Raj et al. | |
| 2015/0132585 | A1 * | 5/2015 | Pan | C09K 11/617 |
| | | | | 252/301.4 F |
| 2018/0250905 | A1 * | 9/2018 | Cho | B30B 11/027 |
| 2019/0062221 | A1 | 2/2019 | Chu et al. | |
| 2023/0415377 | A1 * | 12/2023 | Walker | B28B 3/086 |

* cited by examiner

EQUIPMENT FOR SIMULTANEOUS OR NEAR-SIMULTANEOUS FLASH SINTERING AND FORGING

CROSS-REFERENCE TO RELATED APPLICATIONS

The present application claims priority to U.S. Provisional Application Ser. No. 63/309,831, titled "EQUIPMENT FOR SIMULTANEOUS OR NEAR-SIMULTANEOUS FLASH SINTERING AND FORGING," filed Feb. 14, 2022, the contents of which are incorporated herein by reference in their entirety.

STATEMENT REGARDING GOVERNMENT SUPPORT

This invention was made with U.S. Government support under Agreement No. 89233218CNA000001 awarded by the Department of Energy to Triad National Security, LLC. The government has certain rights in the invention.

BACKGROUND

There is growing interest and increased usage and application of advanced ceramics worldwide in many different technological fields. Some of these advanced ceramic materials are very difficult to sinter because of the high temperatures, long times, and high pressures needed to densify them. Existing ceramic-producing and sintering technologies usually represent an increase in complexity of the production line as well as in increase in resource costs, as high temperatures and high pressures must be generated for long durations of time. Even with expenditure of such high resource costs to sinter ceramics, it is not guaranteed that the final geometry and mechanical integrity can be successfully manufactured, and additional processes such as machining or forging may still be required to reach the final ceramic product. The inventors have identified a number of deficiencies and problems associated with existing ceramic-producing and sintering systems and methodologies. Through applied effort, ingenuity, and innovation, many of these identified problems have been solved by developing solutions that are included in embodiments of the present disclosure, many examples of which are described in detail herein.

BRIEF SUMMARY

Embodiments of the present disclosure provide flash sinter-forging equipment, or equipment for simultaneous or near-simultaneous flash sintering and forging, to produce dense and net or near-net shaped objects, and methods of use thereof. In various embodiments, the flash sinter-forging equipment is configured to sinter conventionally difficult-to-sinter materials at lower temperatures compared to existing technologies, and further, to sinter said materials in the span of minutes as opposed to hours or days. Embodiments described herein provide for flash sinter-forging of ceramic material to produce dense, near-net shaped, and/or net shaped objects, thereby minimizing or eliminating a need for further machining processes before and after the flash sinter-forging. In some examples, embodiments of the present disclosure may be applied to produce advanced ceramic nuclear fuels including UN, UB2, and UC at improved efficiency, as such products would conventionally require sintering temperatures of above 1600° C. under constrained atmospheres over the span of at least hours. Further example applications may generally include the production of ceramic objects, including oxides, nitrides, carbides, silicides, borides, and/or the like, which may be used as components for biomedical implants, armor plates, high temperature ceramics, nuclear fuels, scintillators, solid oxide fuel cells, solid state batteries, and structural ceramics, among others.

In particular, various embodiments provide flash sinter-forging herein through the application of high electric fields, electric current, and mechanical pressure to a material within an operation time period (e.g., in a simultaneous or near-simultaneous manner) to produce a target object. With the application of electric fields/current and mechanical pressure, the material can be densified and shaped into the target object within a few minutes, in various examples. The electrification of the material with flash sintering enables lower temperatures to be used to appropriately forge and shape the material into the target object, thereby providing a synergistic and resource-conserving technical effect. In some examples, more than 90% of energy expenditures for object production can be saved using flash sinter-forging in accordance with various embodiments described herein. Further, in various embodiments described herein, an atmosphere within which flash sinter-forging is performed is not constrained, and flash sinter-forging can be performed within high vacuum and oxidizing atmospheres, in some examples.

The details of one or more embodiments of the subject matter described in the present disclosure are set forth in the accompanying drawings and the description below. Other features, aspects, and advantages of the subject matter will become apparent from the description, the drawings, and the claims.

BRIEF DESCRIPTION OF THE FIGURES

Having thus described the disclosure in general terms, reference will now be made to the accompanying drawings, which are not necessarily drawn to scale.

Figure 1:
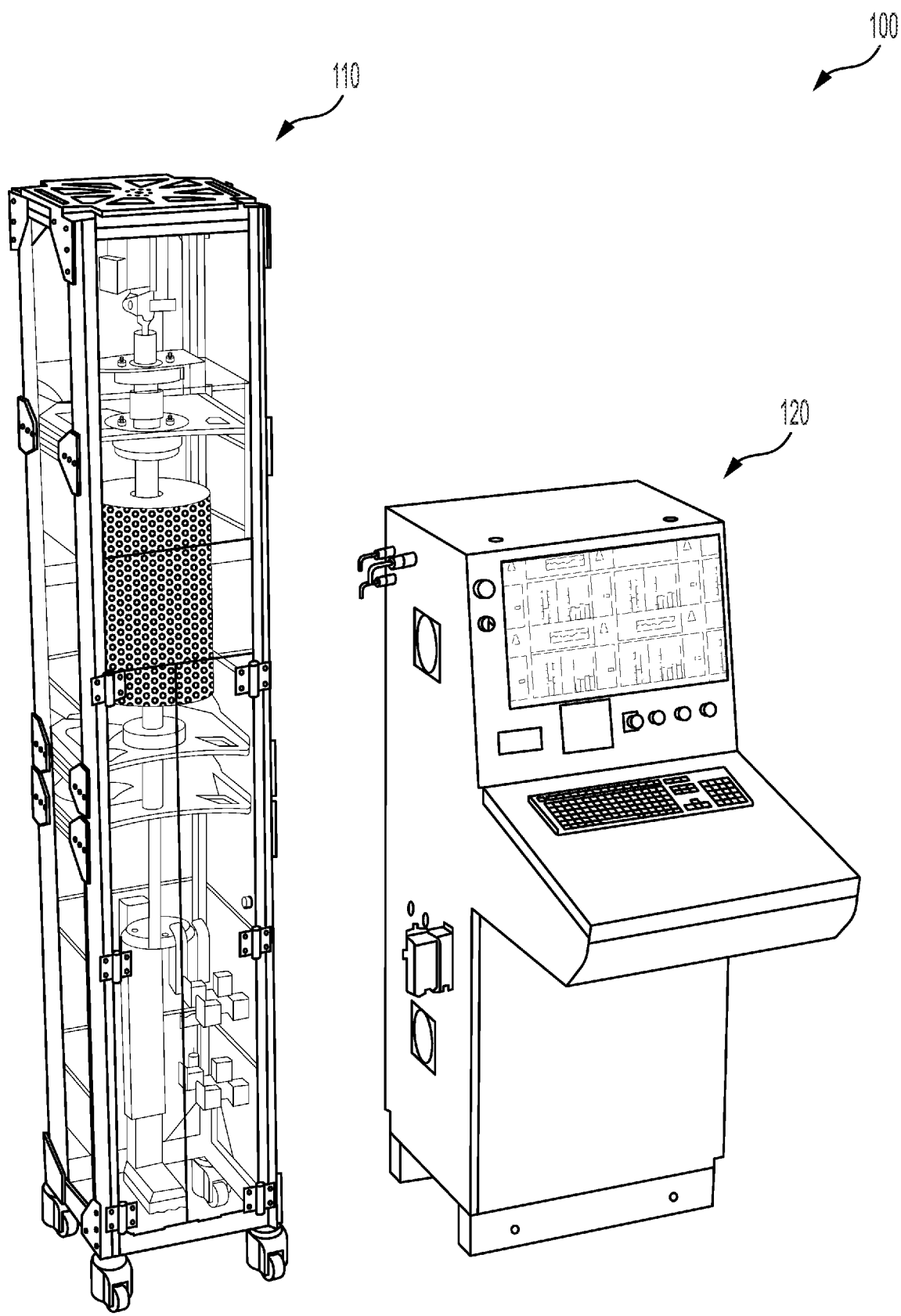

FIG. 1 depicts an example apparatus configured for simultaneous or near simultaneous flash-sintering and forging of material to produce target objects, in accordance with various embodiments.

Figure 2:
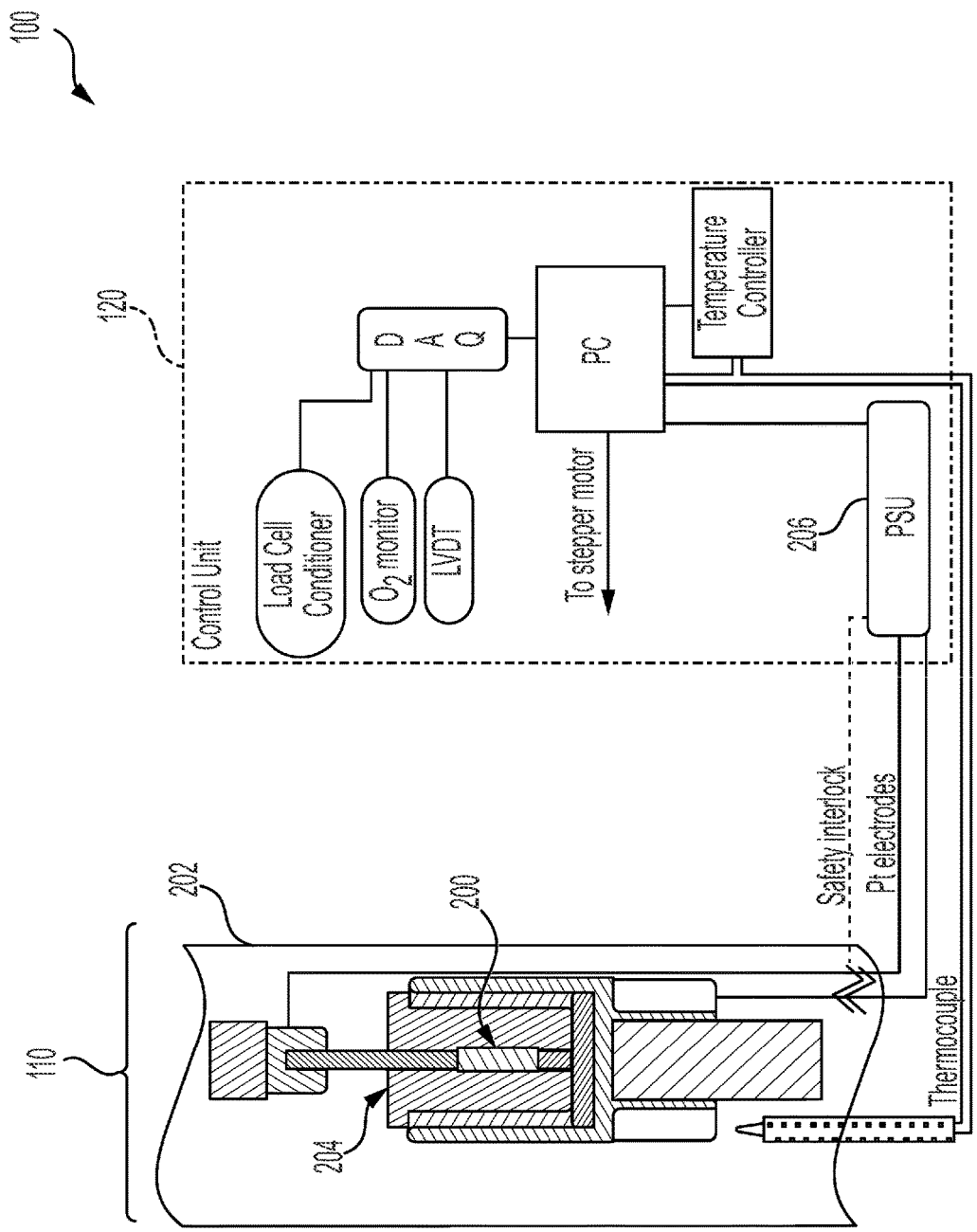

FIG. 2 provides a schematic diagram for an example apparatus configured for simultaneous or near simultaneous flash-sintering and forging of material to produce target objects, in accordance with various embodiments.

Figure 3:
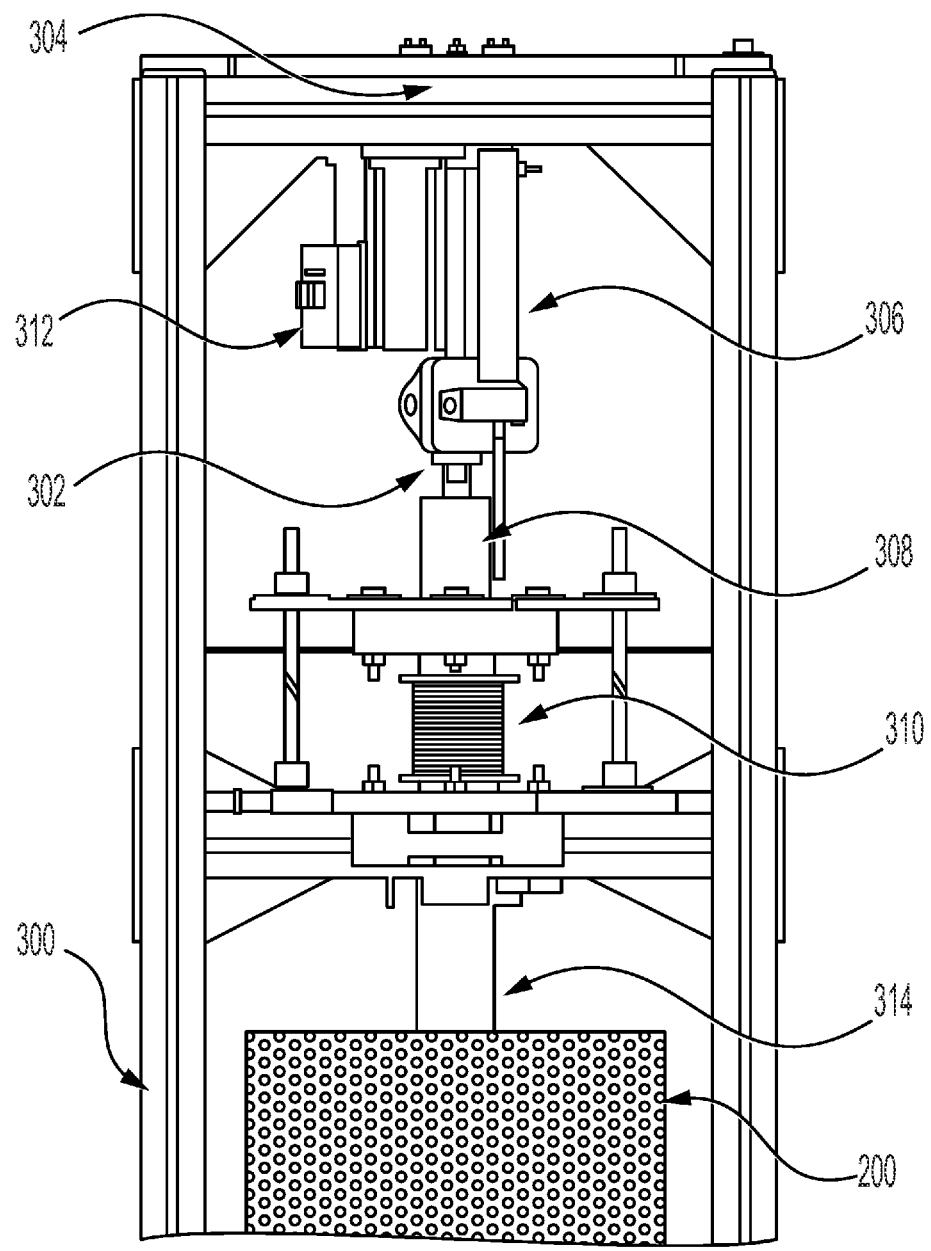

FIG. 3 provides a diagram for an actuator component configured to cause application of compressive force on material during flash sinter-forging to produce target objects, in accordance with various embodiments.

Figure 4B:
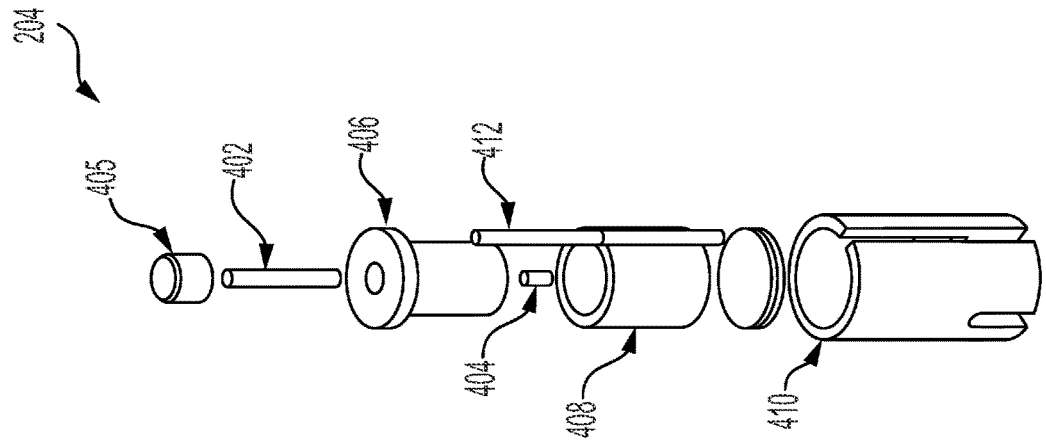
Figure 4A:
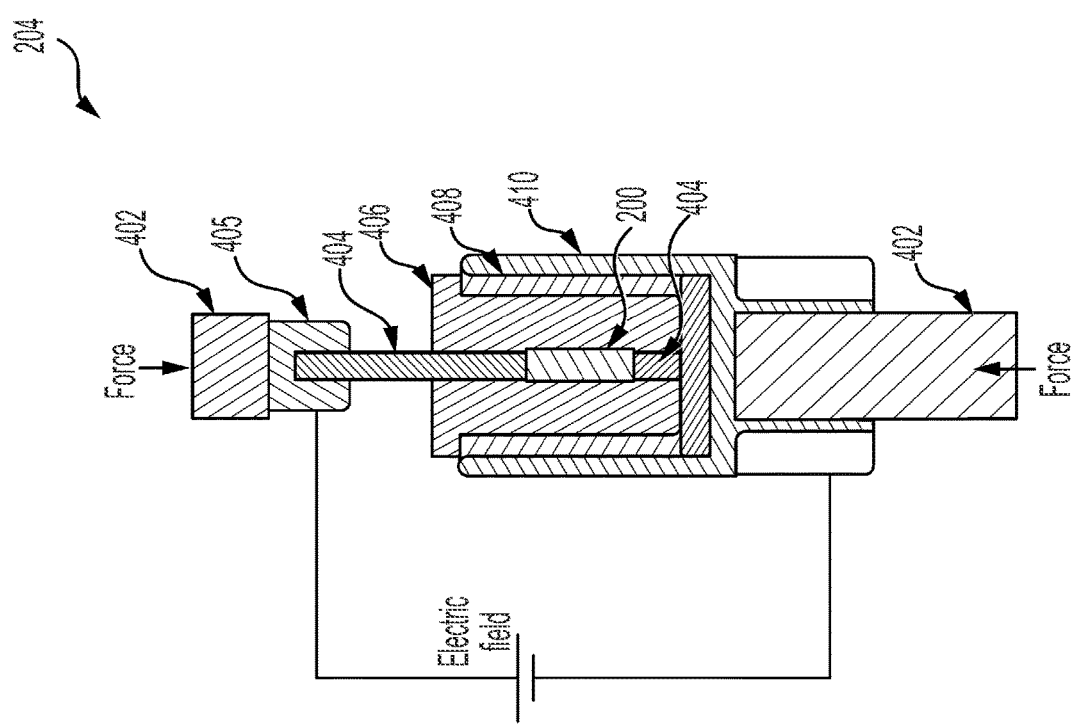

FIG. 4A provides a schematic diagram for a die and punches configured to enable application of electric fields/current and compressive force to a material during flash-sinter-forging to produce target objects, in accordance with various embodiments.

FIG. 4B depicts an exploded view of a die and punches configured to enable application of electric fields/current and compressive force to a material during flash-sinter-forging to produce target objects, in accordance with various embodiments.

Figure 5A:
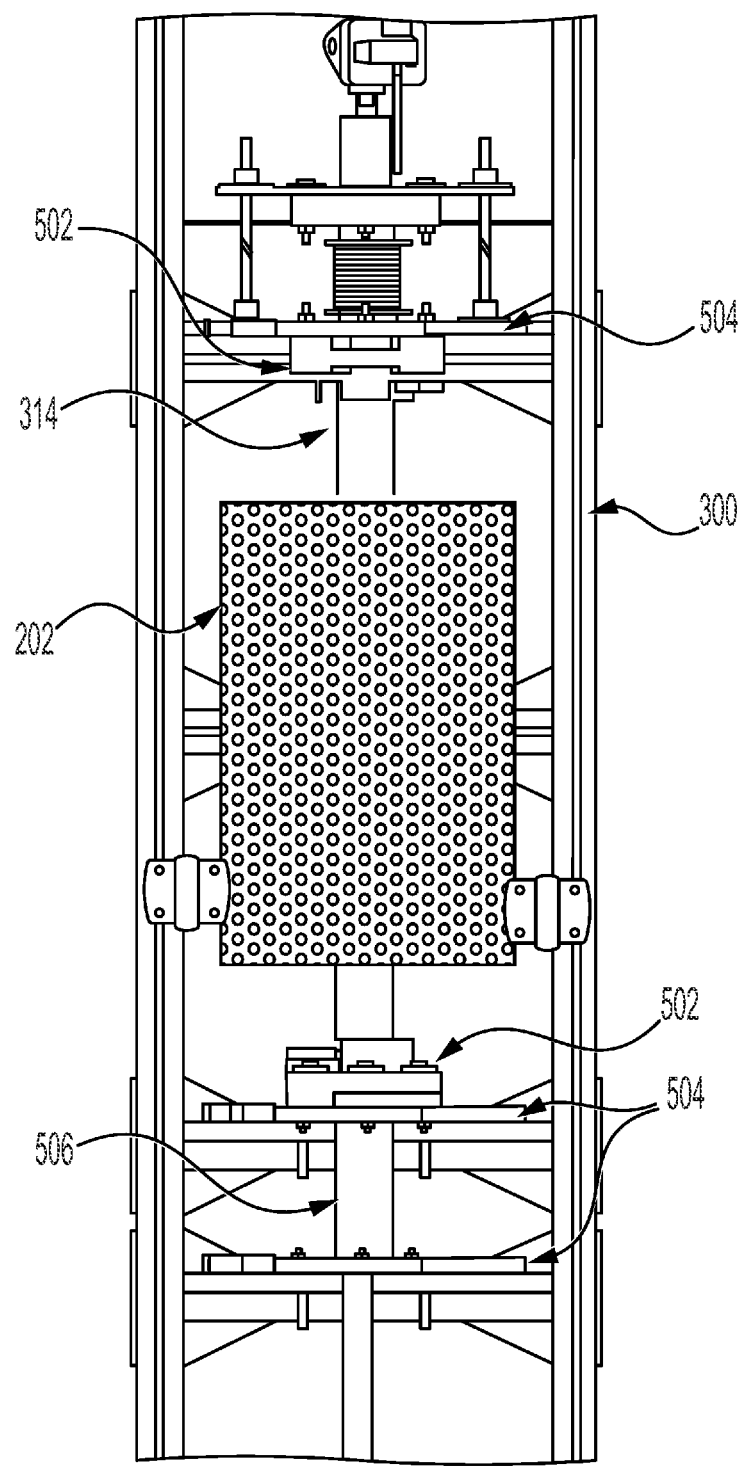

FIG. 5A provides a diagram for a furnace component configured to generate a furnace environment within which material may be flash sinter-forged to produce target objects, in accordance with various embodiments.

Figure 5B:
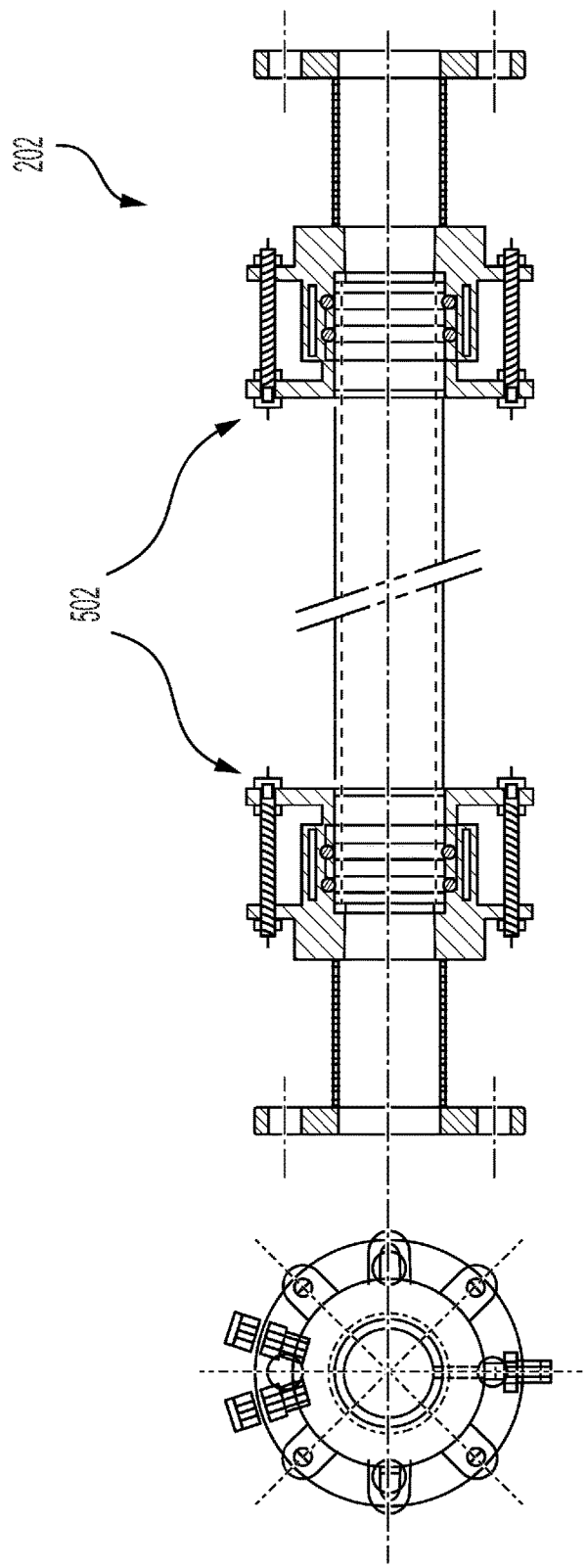

FIG. 5B provides a schematic diagram for a furnace component configured to generate a furnace environment within which material may be flash sinter-forged to produce target objects, in accordance with various embodiments.

Figure 5C:
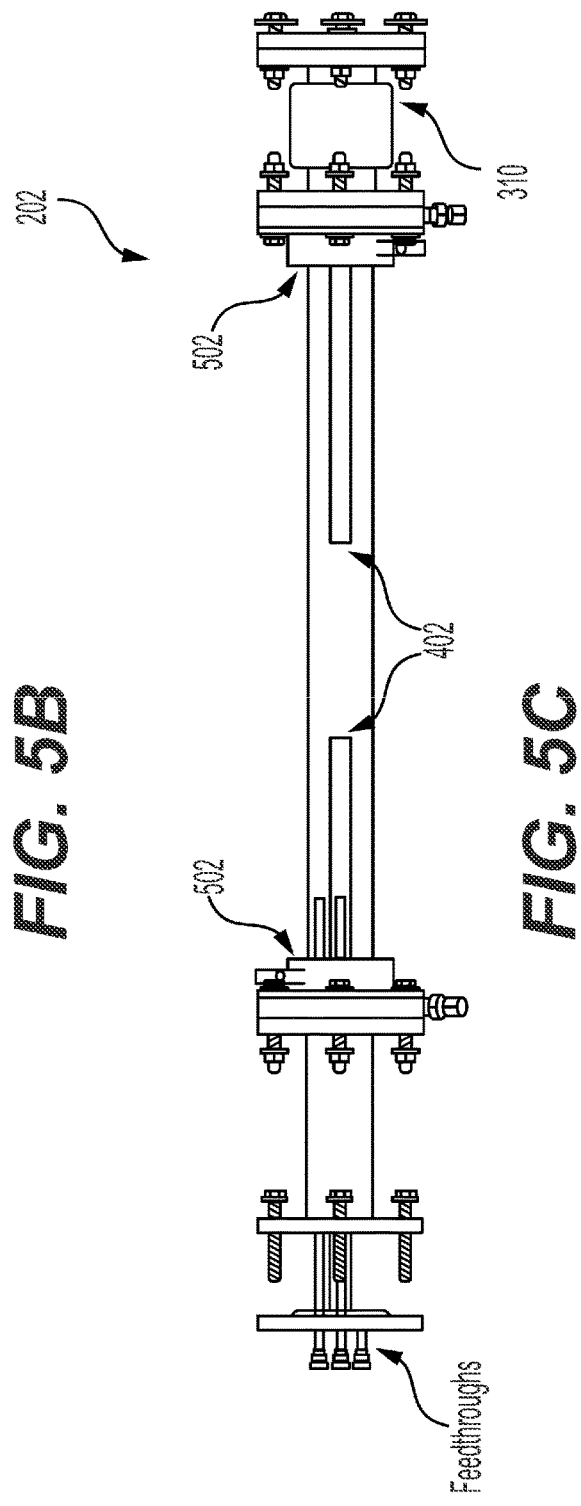

FIG. 5C provides a schematic diagram for a furnace component configured to generate a furnace environment within which material may be flash sinter-forged to produce target objects, in accordance with various embodiments.

Figure 6:
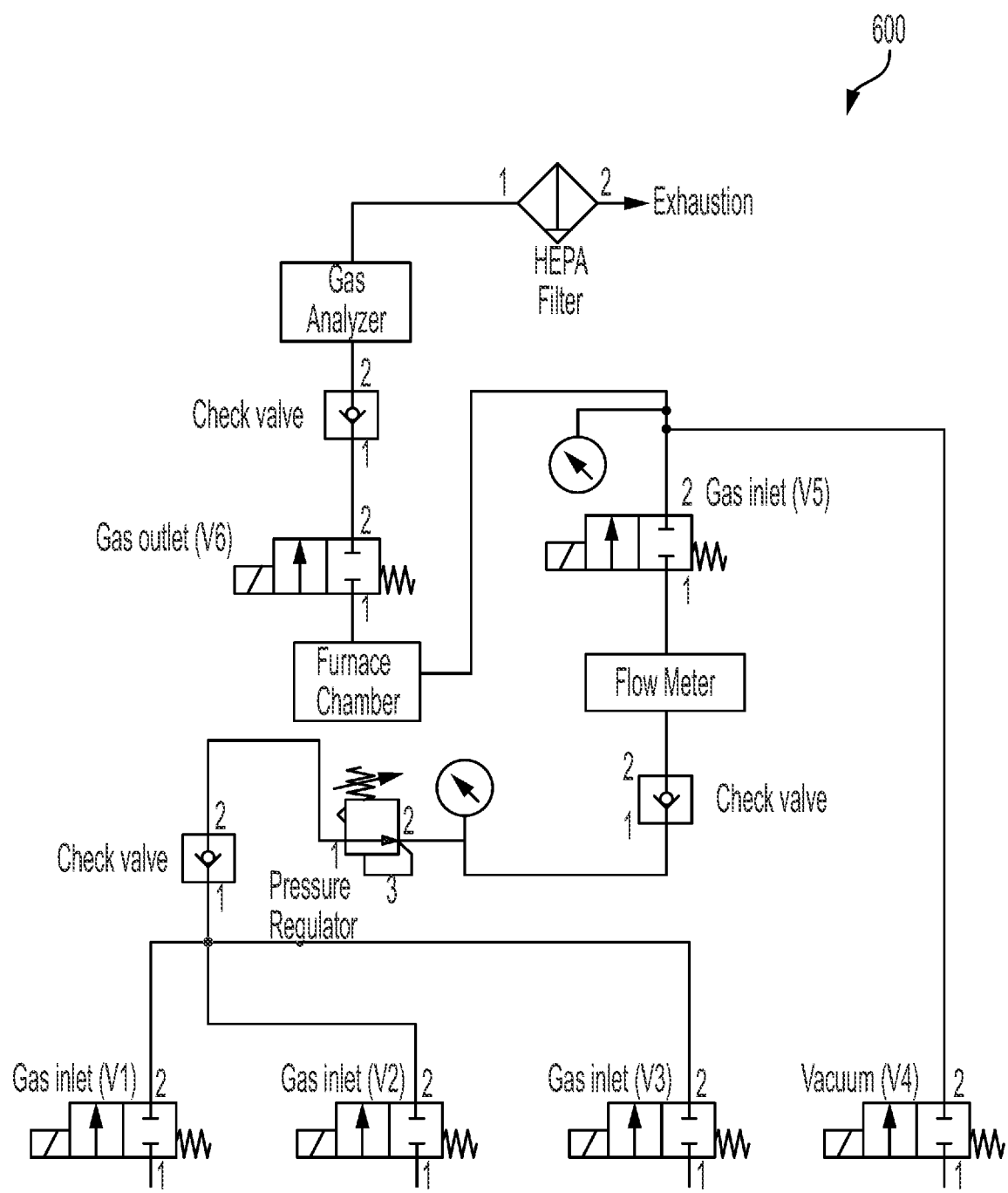

FIG. 6 provides a schematic diagram for a gas supply configured to enable generation of a furnace environment within which material may be flash sinter-forged to produce target objects, in accordance with various embodiments.

Figure 7A:
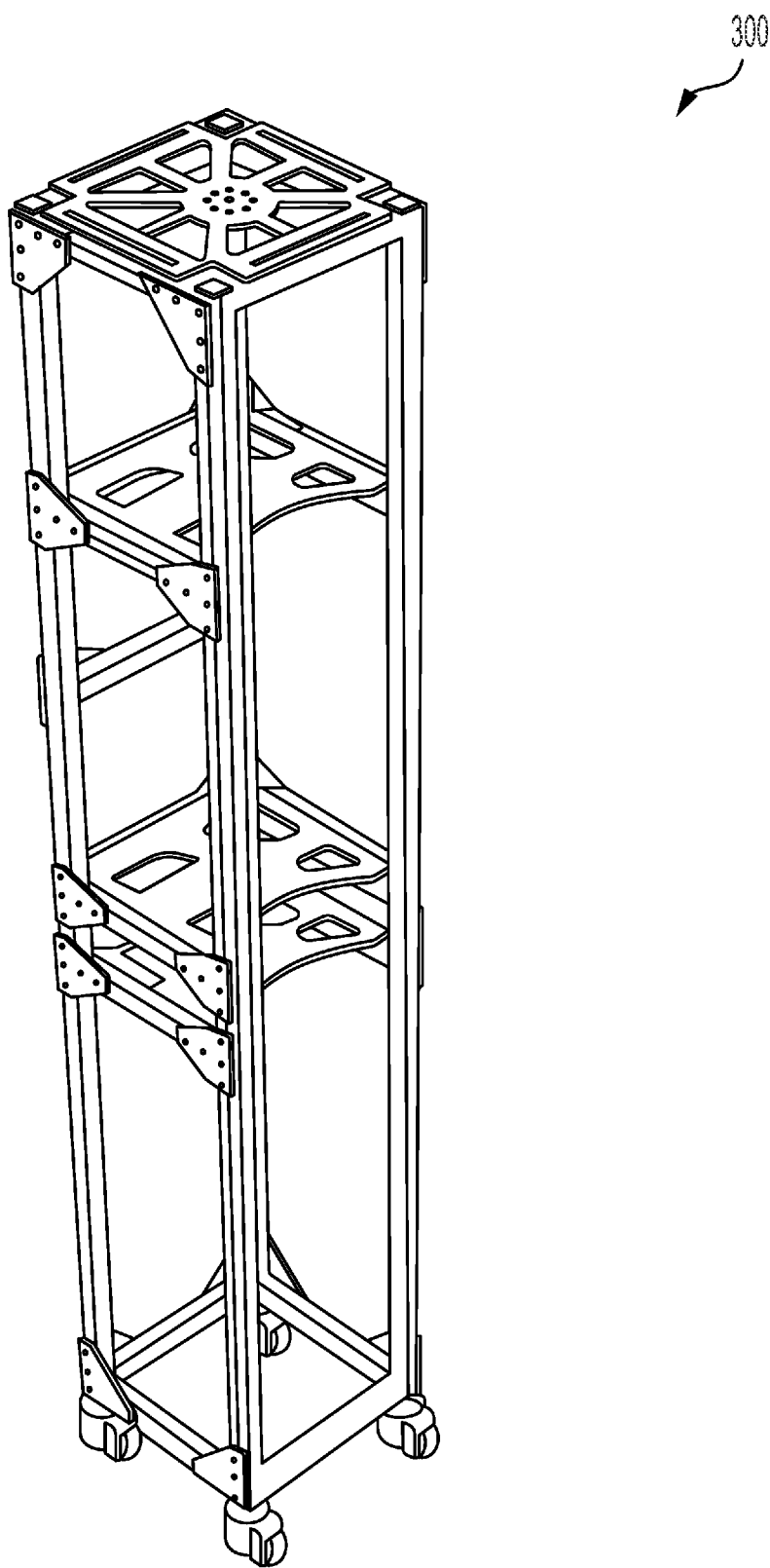

FIG. 7A depicts a load frame within which electric fields/current and compressive force may be applied to materials for production of target objects, in accordance with various embodiments.

Figure 7C:
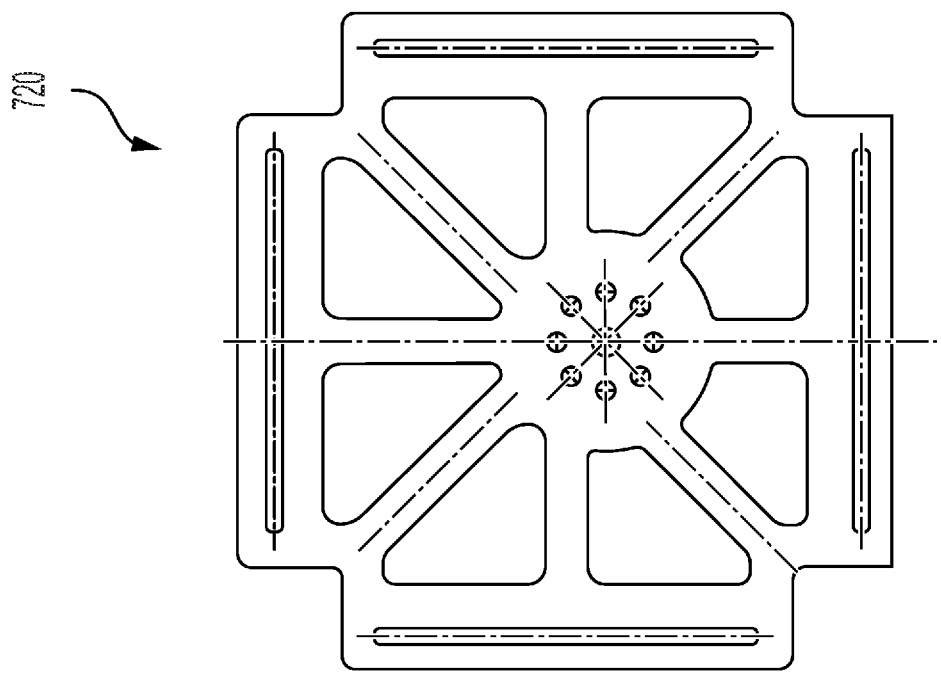
Figure 7B:
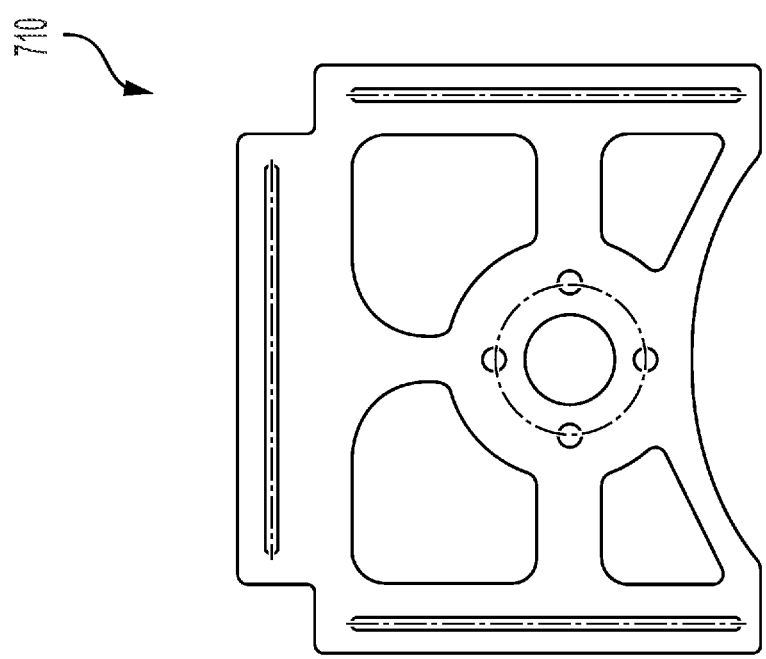

FIG. 7B provides a schematic diagram for a load frame within which electric fields/current and compressive force may be applied to materials for production of target objects, in accordance with various embodiments.

FIG. 7C provides a schematic diagram for a load frame within which electric fields/current and compressive force may be applied to materials for production of target objects, in accordance with various embodiments.

Figure 8A:
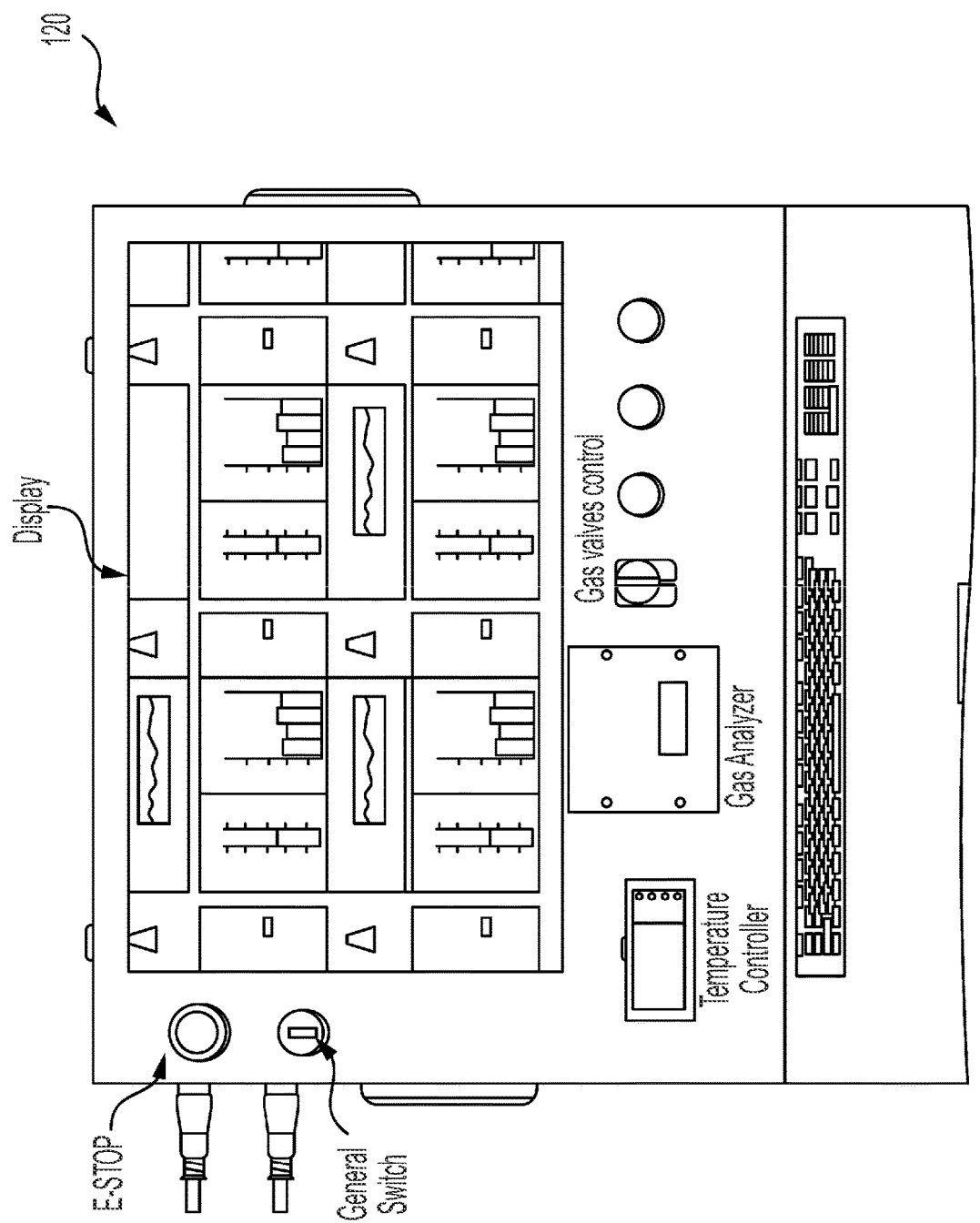

FIG. 8A depicts a control unit used to control flash-sinter-forging of material to produce target objects, in accordance with various embodiments.

Figure 8B:
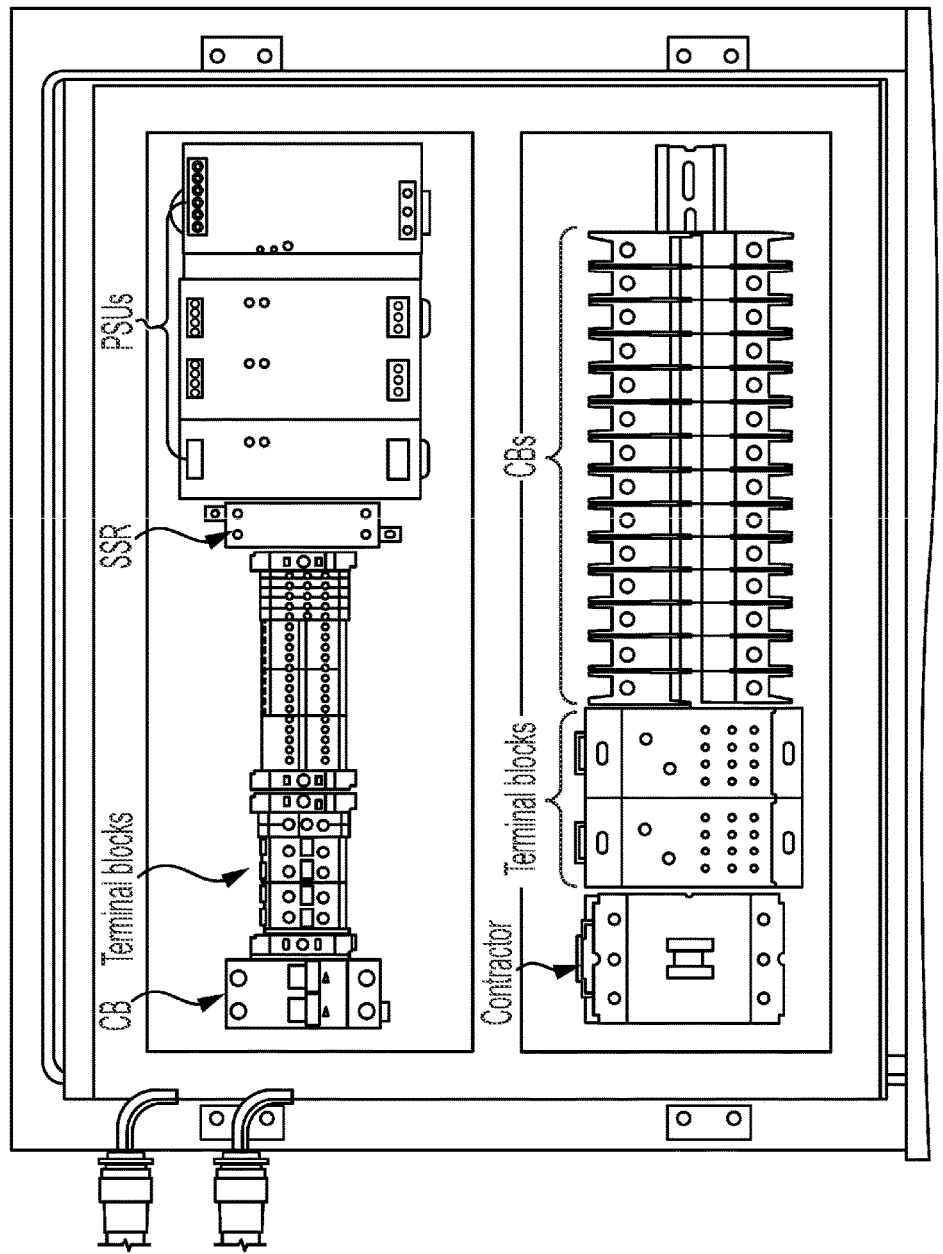

FIG. 8B depicts a control unit used to control flash-sinter-forging of material to produce target objects, in accordance with various embodiments.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Embodiments of the present disclosure provide equipment, systems, apparatuses, devices, methods of use, and/or the like for simultaneously or near-simultaneously sintering and forging materials to form dense and near-net shaped objects. In various embodiments, ceramic materials, oxides, and non-oxides can be sintered and forged to produce objects more than ten times faster than existing technologies, in some examples. Embodiments described herein incorporate electrical fields/currents and mechanical pressure to promote fast densification and shaping of materials to form objects. Embodiments of the present disclosure involve the performance of both flash sintering, which uses electric fields and electric currents to promote fast densification of material (e.g., ceramic powder) due to Joule heating, and sinter-forging, which involves application of mechanical pressure during sintering to generate shaped parts.

Additionally, various embodiments described herein can be applied to synthesize new materials through reactive synthesis. The synthesis of some materials, such as garnets, mixed oxides, carbides, nitrides, and/or the like, can be performed within a few minutes due to the electric current flowing through the material and resulting rapid Joule heating, in some examples.

Generally, apparatuses described herein for flash sinter-forging may have a relatively small footprint (e.g., less than approximately 20 feet by approximately 20 feet, less than approximately 10 feet by approximately 10 feet, less than approximately 7 feet by approximately 7 feet), in some examples, and feature reduced energy consumption. For instance, energy consumption for flash sinter-forging in accordance with various embodiments described herein may be less than approximately 50 kWh, less than approximately 20 kWh, or less than approximately 10 kWh.

According to various embodiments, flash sinter-forging may comprise pressing material into a die and flowing electric current through the material while positioned within the die. In particular, the die comprises an electrically insulated core, and the material is compressed using at least one punch (e.g., a rod, a member, and/or the like) comprising electrically conductive material and acting as electrodes. In various embodiments, the die is electrically non-conductive relative to the at least one punch; for example, the die is composed of, coated with, and/or comprises non-conductive material. The non-conductive material contacts (e.g., at least partially encapsulates) the material to be flash sinter-forged, such that the material to be flash sinter-forged is blocked from electric conduction through the die itself.

In various embodiments, the material is compressed using at least one punch, which is configured to exert pressure (e.g., uniaxial pressure) upon the material. The at least one punch can be configured with various shapes and geometries that enable and/or optimize the pressure exerted upon the material. For instance, the at least one punch can be configured with a particular geometry to define a particular pressure gradient or lack thereof (e.g., a uniform pressure) within the material. In various embodiments, the at least one punch is configured to exert a uniform pressure upon the material.

As discussed, the at least one punch is further configured to direct electric current into the material, and specifically may be configured to direct electric current simultaneous to or near simultaneous to the exertion of pressure upon the material. In various embodiments, alternating current (AC), direct current (DC), or a combination thereof with one or more waveforms may be used to induce the flash sintering. Aspects and characteristics of the electrical current (e.g., frequency, bandwidth, waveforms, and/or the like) can be controlled to enable the production of homogenous objects and/or non-homogenous objects with different geometries and/or material properties. In various embodiments, the at least one punch is configured with a shape and/or geometry to enable homogenous current flow through the material. For instance, the at least one punch may be configured with a geometry adapted for and/or corresponding to an alternating current waveform. Similarly, the at least one punch is configured with one or more material compositions and/or gradients enabling homogenous current flow through the material. For instance, the at least one punch may be manufactured with minimized impurities and imperfections such that electric current flowing through the at least one punch exhibits maximized homogeneity.

Meanwhile, a furnace environment encompassing the die and the material can be set to a furnace temperature and a furnace atmosphere to facilitate forging of the material simultaneous or near-simultaneous to the flowing of electric current. Specifically, the die and the material may be preheated before and heated during flash-sintering. The forging capability through heating and compressing the material is enhanced by superplastic behavior of the material that is induced by the electric current, and thus, net shaping and/or near-net shaping during densification is enabled. That is, with the superplastic behavior of the materials, lower furnace temperatures are needed to forge the material into its net or near-net shape.

Referring now to FIG. 1, an example apparatus 100 for flash sinter-forging is illustrated. In various embodiments, the apparatus 100 is configured to, with material loaded into a die, cause electric current to flow through the material in an isolated manner, heat the material and/or the die, and apply compressive force to the material within the die within an operational time period for simultaneous or near-simultaneous flash sintering and forging. Thus, the apparatus 100 is configured for synthesis, shaping, and/or densification of materials in a short period of time with low electric power consumption, in various examples.

In various embodiments, the apparatus 100 includes an action unit 110 and a control unit 120. The action unit 110 comprises components that are controlled by the control unit 120 to perform flash sinter-forging of materials within the action unit 110. Accordingly, the control unit 120 may be in communication with certain components of the action unit 110, and an operator or a user may control aspects of flash sinter-forging performance.

Although not explicitly illustrated, the apparatus 100 may include various auxiliary components including gas sensors, mass spectrometers, impedance spectrometers, pyrometers, light spectrometers, video cameras, Raman spectrometers, laser vibrometers, other noncontact sensors and instruments, and/or the like to collect data for and inform on the performance of flash sinter-forging.

FIG. 2 provides a schematic diagram of the apparatus 100 to describe various components for flash sinter-forging. As shown, the action unit 110 includes a furnace 202 (e.g., a furnace tube) within which a die 204 may be positioned. The die 204 defines a volume within which material 200 can be positioned for flash sinter-forging. In various embodiments, the die 204 is electrically non-conductive, such that the material 200 is at least partially blocked (e.g., insulated) from electrical conduction through the die 204 itself.

Meanwhile, the control unit 120 comprises various components enabling the control of the action unit 110. For instance, in various embodiments, a high voltage power supply unit (PSU 206) is connected to at least one punch adjacent to and aligned with the die 204 through platinum electrodes such that an electrical field can be generated to flash sinter the material 200. As shown in FIG. 2, the PSU 206 is controlled by a computer inside the control unit 120. With the PSU 206, the control unit 120 is configured to control an electric current and/or an electric field directed into the material 200 for flash sinter-forging; for example, the control unit 120 may generate one or more waveforms, determine certain frequencies and/or bandwidths for an electric current, and/or the like. The computer is also responsible for the furnace temperature regulation, monitoring the 02 content in the outlet gas, recording the sample shrinkage through the LVDT, and adjusting the force applied by the linear actuator, in various embodiments. To minimize electrical hazards, a magnetic safety interlock ensures that the power supply output can only be activated if the tubular furnace is closed and the leads are not exposed, for example.

In various embodiments, the PSU 206 may be capable of delivering 400 VAC or 500 VDC and 15 A (RMS) or 12 ADC. Generally, the PSU 206 may be operated based at least in part on the material 200. For example, for flash-sintering of oxide materials, the optimum electric fields may be controlled to lower than 1000 V/cm and the current density lower than 300 mA/mm2, while for flash-sintering of uranium dioxide, current densities higher than 600 mA/mm2 may be generated. In various embodiments, particular properties and aspects of an electric field provided via the PSU 206 are controlled via the control unit 120, and the control unit 120 may rely upon feedback from sensor data collected from the action unit 110 to control the electric field and/or an electric current.

Referring now to FIG. 3, an actuator component of the action unit 110 is illustrated. In various embodiments, the action unit 110 includes a load frame 300 within which an actuator can be controlled to apply compressive force to material 200 positioned within the die 204. The actuator may specifically apply force through punches aligned with the die 204 to densify the material 200.

In various embodiments, the action unit 110 comprises an actuator 302, a load cell 304, a linear variable differential transformer (LVDT 306), a spring 308, a flexible guided bellow 310, and/or the like, as presented in FIG. 3. In various embodiments, the actuator 302 may be an electrical and/or linear actuator. In one example, the actuator 302 has a 3.2" stroke with 500 lbf continuous operation force. In various embodiments, a pancake style load cell may be used. In various embodiments, the LVDT 306 may have an approximately 50 mm stroke length. In various embodiments, the spring 308 is a guided spring with an elastic constant of 329 kN/m. As illustrated in FIG. 3, the action unit 110 may further comprise a stepper motor drive 312 and a quartz tube 314.

In various embodiments, mechanical pressure is applied to the material 200 positioned inside the die 204 through alumina punches, and the top rod is connected to the actuator 302 by the flexible guided bellow 310. This ensures that the atmosphere and furnace heat are relatively confined to the quartz tube 314. In various embodiments, the punches may be made of alumina (e.g., 99.8% purity), may be resistant to temperatures up to 1600° C., and/or may be inert under most atmospheres. A closed proportional-integral-derivative (PID) controlled loop between the load cell 304 and the actuator 302 may be used in order to control the pressure applied to the material 200 at any time. Because the actuator 302 is driven by the stepper motor drive 312, which means that the position of the actuator 302 is the only variable of control, the spring 308 may be positioned between the actuator 302 and the flexible guided bellow 310 to guarantee that the force increases linearly with the position of the actuator 302.

Referring now to FIGS. 4A and 4B, a die 204 is illustrated with punches 402 aligned with its central axis and positioned above and below the material 200. As discussed, the punches 402 are electrically conductive and serve as electrodes while also applying compressive force to the material 200. Meanwhile, the die 204 itself may be electrically non-conductive, such that the electrification of the material 200 is provided primarily through the punches 402 and reduced or blocked through the die 204 itself.

In various embodiments, the die 204 is configured to sustain its integrity under high temperature (e.g., >1600° C.) and high stress (e.g., ≥100 MPa), while the punches 402 transfer high voltages (e.g., up to 600 V), and high electric currents (e.g., >10 A) to the material 200 positioned inside. Also, the die 204 should not react with the material 200 to be produced, and in some examples, carbon may be avoided or minimized in the die 204. In such examples, the metallic parts may be made of titanium zirconium molybdenum alloy 364 recrystallized (TZM), which is almost carbon free, has good electrical conductivity, and good mechanical properties even at high temperatures.

In the illustrated embodiment, the die 204 comprises pistons 404 that are electrically conductive (e.g., made of TZM) and are connected to electrodes from the PSU 206. In the illustrated embodiment, the piston 404 positioned above the material 200 may include a top cover 405 that may also be electrically conductive (e.g., made of TZM). In various embodiments, the die 204 includes an electrically-insulated liner 406 that defines the volume or cavity within which the material 200 is positioned. In the illustrated embodiment, the electrically-insulated liner 406 defines a cylindrical volume within which the material 200 may be positioned between the two pistons 404. In one or more example embodiments, the electrically-insulated liner 406 is formed of ceramic material, such as high alumina (e.g., 99.8% Al2O3) material. The electrically-insulated liner 406 serves to ensure that electrical current flows through the material 200. In various embodiments, the electrically-insulated liner 406 may be positioned within a sleeve 408 that is electrically conductive (e.g., made of TZM), which serves as a safety feature in case of abrupt failure of the electrically-insulted liner 406.

In various embodiments, the die 204 further comprises a guide 410 within which the sleeve 408 is positioned, and the guide 410 may be energized. As illustrated, one or more wires may connect the upper piston 404 to the energized guide 410, and the guide 410 may be formed of TZM. In various embodiments, a boron nitride (BN) tube 412 is used to ensure electrical insulation of the wires connected to the top piston from the energized guide 410.

Referring now to FIGS. 5A-5C, diagrams illustrating a furnace 202 are provided. The furnace 202 may serve to generate a furnace environment and heat the die 204 and the material 200 to enable flash sinter-forging of the material 200 to its net or near-net shape.

In various embodiments, the furnace 202 may be tubular and may be mounted within the load frame 300, as illustrated in FIG. 5A. In various embodiments, the furnace 202 may be heated up to at least 1200° C. with a controlled atmosphere and may include electrical heating elements. In various embodiments, the furnace 202 comprises one or more flanges 502 to allow for electrodes and thermocouple feedthroughs, as detailed in FIGS. 5B and 5C. In various embodiments, the furnace 202 also includes one or more base plates 504 at either end, as well as one or more nipples 506.

In some example embodiments, the flanges 502 may include one or more side gas ports. In one or more examples, the flanges 502 may be water-cooled. For instance, the flanges 502 may be cooled by a water chiller with a flow of approximately 1.6 L/min. As shown in FIG. 5C, the punches 402 are connected to the flexible guided bellow 310 on the top of the quartz tube and to the bottom flange 502, and can move up and down for loading and unloading of the die 204.

FIG. 6 provides a diagram illustrating a gas line arrangement 600 for generating the furnace atmosphere within the furnace 202. In various embodiments, the atmosphere may enjoy a range of different gas compositions given that the die 204 is formed of a non-graphite material. In various embodiments, the gas composition and a pressure of the atmosphere can be controlled via the control unit 120. In some examples, the atmosphere may be constrained based at least in part on failure of the quartz tube 314, for example, the differential pressure of the atmosphere is below 5 psi. As illustrated in FIG. 6, the gas line arrangement 600 includes solenoid valves, pressure regulators, flow meters, flow regulators, gauges, check valves, relief values, vacuum pumps, and/or the like to generate a furnace atmosphere with a desired gas composition and pressure. In various embodiments, the gas line arrangement 600 may include an oxygen analyzer mounted on the outlet line to monitor downstream flow. In some applications of various embodiments of the present disclosure, the gas line arrangement 600 may include various filters, valves, and check valves to avoid improper release of contaminated gas (e.g., when the material 200 is a nuclear material).

Referring now to FIGS. 7A-7C, a load frame 300 is illustrated. In various embodiments, the load frame 300 may define the overall geometry of the action unit 110; that is, the components for performing flash sinter-forging may be positioned within the load frame 300. In various embodiments, the load frame 300 may be formed of aluminum and includes a base plate 710 adapted for the flanges 502 of the furnace 202. Further, the load frame 300 may include a top plate 720 adapted for the actuator 302. In some embodiments, each of the base plate 710 and the top plate 720 are formed of steel. In various embodiments, the load frame 300 is configured to support the force from the actuator 302.

Thus, as shown, the load frame 300 enables the action unit 110 to have a small footprint and to be modular and mobile (e.g., relative to the control unit 120). For instance, the load frame 300 may include mobility means enabling transportation of the action unit 110. In order to provide protection from users, the load frame 300 may include an enclosure configured to contain debris from a possible failure in the quartz tube 314, and the enclosure may be polycarbonate, in some examples.

As described, the control unit 120 is configured to control the flash sinter-forging of material 200, and an example control unit 120 is illustrated in FIGS. 8A and 8B. Thus, the control unit 120 centralizes all the system controls for the action unit 110. In the illustrated embodiment, the control unit 120 includes a display that may be used to indicate various data collected during flash sinter-forging, such as data related to the furnace environment, data related to the compressive force applied to the material 200, data related to the electric currents flowed through the material 200, and/or the like.

Further, the control unit 120 includes controls, switches, buttons, and/or the like. For instance, the control unit 120 includes buttons to control the PSU 206, the furnace 202, the actuator 302, various gas valves, and/or the like. In various embodiments, the control unit 120 receives feedback data from sensors within the action unit 110, and uses the feedback data to control the PSU 206, the furnace 202, the actuator 302, the various gas values, and/or the like. As such, the control unit 120 may include automated control logic, such as linear feedback control, non-linear feedback control, proportional-integral-derivative (PID) control, control via machine learning with the feedback data, and/or the like. In various embodiments, the control unit 120 may be used to select between different gas atmospheres for the furnace environment, set a furnace temperature profile, adjust the compressive force applied to the material, select between AC, DC, or a combination thereof for flowing through the material, define an electric current frequency and waveform shape, define the electric current profile generally, and/or the like. Such aspects of flash sinter-forging may be controlled via a graphical user interface (GUI) provided via the display, in some embodiments. In various embodiments, the control unit 120 may execute various software applications configured to control various components of the action unit 110 in response to user input and interaction. Such software applications may be further configured with fail-safes that may automatically activate upon detection of fault events, such as electric current leak, disproportionate axial load or displacement of the actuator 302, excess oxygen in the furnace atmosphere, overheating due to a chiller fault, and/or the like. Upon detection of such fault events, the control unit 120 may automatically reset the action unit to a non-operational state in which the actuator 302 is in a neutral position and both the furnace 202 and the PSU 106 are off, for example.

Thus, as described above, various embodiments described herein provide for flash sinter-forging of material to produce dense and net or near-net shaped objects. Within an operational time period, material 200 positioned within a die 204 may be compressed, electrified, and heated using various components described herein. In a non-limiting example, an apparatus in accordance with various embodiments described herein is configured at least (i) to deliver a uniaxial load up to approximately 100 MPa upon material 200 (e.g., a ceramic powder) within a carbon-free die set, (ii) generate a furnace environment up to approximately 1200° C., and (iii) generate an electric field through a power supply providing voltages up to approximately 600 V and currents up to 15 A. In various embodiments, the apparatus includes a centralized control unit to regulate various parameters concurrently so that specific trends may be followed. Flash sinter-forging may be automatically controlled via the control unit 120, in some embodiments, to ensure safe operation and the production of dense and net or near-net shaped objects. Various embodiments described herein may be applied to specifically produce objects having good mechanical integrity and tailored microstructures.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for synthesis of a target object through simultaneous or near simultaneous flash sintering and forging, the apparatus comprising:
 a die defining a cavity having a geometry of the target object, wherein the die is non-conductive such that material positioned within the cavity of the die is at least partially insulated from electrical conduction through the die;
 at least one punch configured to exert a pressure upon the material positioned within the cavity defined by the die, wherein the at least one punch is electrically conductive and is configured to direct electric current into the material, wherein the die comprises a guide positioned outside of an electrically-insulated liner, and wherein the guide is electrically connected to the at least one punch such that the guide is energized; and
 a furnace configured to enclose at least a portion of the die and to heat the material within the die for an operational time period during which the at least one punch exerts the pressure upon the material and directs the electric current into the material.

2. The apparatus of claim 1, further comprising:
 a control unit configured for at least, during the operational time period:
   providing the electric current into the material positioned within the cavity via the at least one punch and from a power supply;
   causing exertion of the pressure upon the material positioned within the cavity through the at least one punch via at least one actuator and/or motor; and
   controlling a temperature and a gas composition of a furnace environment generated by the furnace.

3. The apparatus of claim 2, wherein the control unit comprises a display for a graphical user interface configured to enable an operator to select a plurality of parameters for at least an electric field, the pressure, the temperature, and the gas composition.

4. The apparatus of claim 1, wherein the die is electrically insulated from the at least one punch.

5. The apparatus of claim 1, wherein the die is formed of a carbon-free ceramic material.

6. The apparatus of claim 1, wherein the at least one punch is coupled to at least one actuator and/or motor that is secured within a load frame, and wherein the furnace is secured within the load frame.

7. The apparatus of claim 6, wherein the load frame comprises mobility means configured to enable transportation of the load frame with the die, the at least one punch, and the furnace being positioned within the load frame.

8. The apparatus of claim 1, further comprising:
 one or more sensors configured to provide feedback data for controlling the heating of the material, the pressure exerted upon the material, and the electric current directed into the material to facilitate the simultaneous or near simultaneous flash sintering and forging of the target object.

9. The apparatus of claim 2, wherein the electric current has a current density configured based at least in part on a composition of the material and the temperature of the furnace environment.

10. The apparatus of claim 1, wherein the electric current directed into the material is an alternating current (AC), a direct current (DC), or a combination thereof with one or more waveforms.

11. The apparatus of claim 2, wherein the furnace environment is characterized by an oxidizing atmosphere.

12. An apparatus for synthesis of a target object through simultaneous or near simultaneous flash sintering and forging, the apparatus comprising:
 a die defining a cavity having a geometry of the target object, wherein the die is non-conductive such that material positioned within the cavity of the die is at least partially insulated from electrical conduction through the die;
 at least one punch configured to exert a pressure upon the material positioned within the cavity defined by the die, wherein the at least one punch is electrically conductive and is configured to direct electric current into the material, wherein the die comprises a guide positioned outside of an electrically-insulated liner, and wherein the guide is electrically connected to the at least one punch such that the guide is energized; and
 a control unit configured for at least, during an operational time period:
   causing the electric current to be directed into the material positioned within the cavity via the at least one punch, and causing exertion of the pressure upon the material positioned within the cavity through the at least one punch.

13. The apparatus of claim 12, wherein the control unit comprises a display for a graphical user interface configured to enable an operator to select a plurality of parameters for at least an electric field and the pressure.

14. The apparatus of claim 12, wherein the control unit is further configured for, during the operational time period, pre-heating the die and the material positioned within the cavity of the die to enable synthesis of the target object with a lower magnitude of an electric field.

15. The apparatus of claim 14, wherein the die and the material are pre-heated via a furnace within which at least a portion of the die is positioned.

16. The apparatus of claim 15, wherein a temperature and a gas composition within the furnace are controlled using the control unit.

17. The apparatus of claim 15, wherein the die is formed of a carbon-free ceramic material, and wherein a gas composition within the furnace is an oxidizing atmosphere.

18. An apparatus for synthesis of a target object through simultaneous or near simultaneous flash sintering and forging, the apparatus comprising:
   a die defining a cavity having a geometry of the target object, wherein the die is non-conductive such that material positioned within the cavity of the die is at least partially insulated from electrical conduction through the die;
   at least one punch, wherein the die comprises a guide positioned outside of an electrically-insulated liner, and wherein the guide is electrically connected to the at least one punch such that the guide is energized;
   a furnace configured to generate a furnace environment having a temperature and a gas composition enclosing at least a portion of the die; and
   a control unit configured for at least, during an operational time period:
      controlling the temperature and the gas composition of the furnace environment to pre-heat the die and material positioned within the cavity,
      causing, via the at least one punch, electric current to be directed through the material positioned within the cavity, and
      causing, via the at least one punch, exertion of pressure upon the material positioned within the cavity.

19. The apparatus of claim 18, wherein the control unit comprises a display for a graphical user interface enabling an operator to select a plurality of parameters for at least the temperature, the gas composition, the electric current, and the pressure.

20. The apparatus of claim 18, wherein the die is formed of a carbon-free ceramic material, and wherein the gas composition of the furnace environment is an oxidizing atmosphere.

* * * * *